Patented Nov. 13, 1934                                    1,980,606

UNITED STATES PATENT OFFICE 1,980,606

SECONDARY CELL

Edmundo Almeida, London, England, assignor of one-half to Arthur Du Cros, Sussex, England No Drawing. Application August 17, 1932, Serial No. 629,237. Renewed May 24, 1934. In Great Britain July 28, 1931

4 Claims. (Cl. 136—20)

This invention relates to secondary cells or batteries and has for its chief object to provide a new or improved cell or battery of inexpensive manufacture, light weight and long life. The cell or battery according to my invention is also practically free from corrosion effects and is substantially resistant to leakage or deterioration on open circuit.

The secondary cell or battery according to the present invention is characterized by having as an essential component of its electrolyte and also of its electrodes a metal of a particular class, namely a metal having a continuous series of oxides that have different electro-chemical energy and are practically insoluble and practically stable in the electrolyte.

More specifically stated a cell according to the present invention comprises as a negative electrode a metal as aforesaid or a low insoluble oxide thereof, and as positive electrode a higher insoluble oxide of the same metal, whilst the electrolyte consists of a solution of a salt or salts of the said metal, with the optional addition of a soluble salt or salts of any other metal which has a higher reaction energy.

As metallic oxides and metallic salt those of manganese are particularly suitable, but those of other metals falling within the above-mentioned class may be used, as for example nickel, cobalt or lead.

If, in the case of the negative electrode, the selected metal is attacked by water it may be coated or faced with its lowest insoluble oxide. Alternatively, such oxide may be carried in or upon a suitable support such as a metal of lower reaction energy. I remark, however, that the supporting metal, if not inert, will take part in the reaction, and therefore, when its energy, though lower is the closest in value to that of the supported metal, the voltage will be the highest; thus, for instance, I may employ a negative electrode consisting of manganese monoxide supported upon or incorporated in metallic zinc.

In the case of the positive electrode the higher insoluble oxide may be suitably supported upon or incorporated in a chemically inert but electrically conductive material as for example graphite, or alternatively, in or on a metal which, if it does react with the electrolyte forms, an insoluble salt therewith, such as lead when the electrolyte is a sulphate, and silver when the electrolyte is a chloride, a bromide or an iodide.

A highly satisfactory cell according to the present invention is one having a positive electrode consisting essentially of manganese dioxide (suitably supported on or embedded mechanically or chemically in a chemically inert but electrically conductive material); a negative electrode consisting of manganese monoxide deposited on zinc; and an electrolyte consisting of a solution of manganese nitrate, sulphate, or chloride.

The electrolyte may be in the liquid state or in any suitably absorbed form according to the purposes to which the cell is to be put.

The following represent the reactions and effects of a cell composed as described in the preceding paragraph. Effects during discharge may be deduced by following the arrows from start to finish pointing to the right, and recharging effects may be deduced by following the arrows from finish to start pointing to the left.

Discharge ——→  Charge ←——  Diff. in Cal. Kg.

Stage I

Positive.
$3Mn(OH)_4(348.9\ C.Kg) + Mn \rightleftharpoons 4Mn(OH)_3(460\ C.Kg);$    +111.1

Negative.
$Mn(OH)_2(94.8\ C.Kg) + Cl_2(126.46\ C.Kg) + Zn \rightleftharpoons MnCl_2(126.46\ C.Kg) + Zn(OH)_2(85.4\ C.Kg) - 9.4$
Net Gain 101.7 Cal. Kg.
Voltage 2.2

Stage II

Positive.
$8Mn(OH)_3(920\ C.Kg) + Mn \rightleftharpoons 3Mn_3(OH)_8(1000\ C.Kg)$    +80.0

Negative.
$Mn(OH)_2(94.8\ C.Kg) + Cl_2(126.46\ C.Kg) + Zn \rightleftharpoons MnCl_2(126.46\ C.Kg) + Zn(OH)_2(85.4\ C.Kg) - 9.4$
Net gain 70.6 Cal. Kg.
Voltage 1.53

Stage III

Positive.
$Mn_3(OH)_8(333.3\ C.Kg) + Mn \rightleftharpoons 4Mn(OH)_2(379.2\ C.Kg)$    +45.9

Negative.
$Mn(OH)_2(94.8\ C.Kg) + Cl_2(126.46\ C.Kg) + Zn \rightleftharpoons MnCl_2(126.46\ C.Kg) + Zn(OH)_2(85.4\ C.Kg) - 9.4$
Net gain 36.5 Cal.Kg.
Voltage 0.79

Average integral voltage $1/t \int_0^t e\,dt$ of the 1st and 2nd stages together.

Positive.
$2Mn(OH)_4(232.6\ C.Kg) + Mn \rightleftharpoons Mn_3(OH)_8(333.3\ C.Kg)$    +100.7

Negative.
$Mn(OH)_2(94.8\ C.Kg) + Cl_2(126.46\ C.Kg) + Zn \rightleftharpoons MnCl_2(126.46\ C.Kg) + Zn(OH)_2(85.4\ C.Kg) - 9.4$
Net gain 91.3 Cal.Kg.
Voltage 1.90

What I claim is:—

1. A secondary cell consisting, in its condition of readiness for use, of a container, an electrolyte consisting of a solution of a salt of manganese, a negative electrode containing a manganese oxide, and a positive electrode comprising a higher oxide of manganese.

2. A secondary cell consisting, in its condition of readiness for use, of a container, an electrolyte consisting of a solution of a salt of manganese, a negative electrode comprising manganese oxide, and a positive electrode comprising a higher oxide of manganese, the said lower oxide of the negative electrode being supported by a zinc supporting member.

3. A secondary cell comprising in its condition of readiness for use, a positive electrode consisting principally of manganese dioxide, a negative electrode of manganese monoxide, and an electrolyte of a solution of any of the group consisting of manganese nitrate, sulphate, and chloride.

4. A secondary cell comprising in its condition of readiness for use, a container, a negative electrode consisting of manganese having an outer layer of its lowest oxide, a positive electrode comprising a higher oxide of the same metal, and an electrolyte consisting of a solution of a salt of manganese.

EDMUNDO ALMEIDA.